US008531793B2

(12) United States Patent
Bandic et al.

(10) Patent No.: US 8,531,793 B2
(45) Date of Patent: Sep. 10, 2013

(54) DISK DRIVE WITH VARIABLE INCREMENTED COUNTING OF WRITES TO THE DATA TRACKS FOR MINIMIZING THE EFFECT OF FAR TRACK ERASURE

(75) Inventors: Zvonimir Z. Bandic, San Jose, CA (US); Marco Sanvido, Belmont, CA (US); Bruce Alexander Wilson, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 594 days.

(21) Appl. No.: 12/839,391

(22) Filed: Jul. 19, 2010

(65) Prior Publication Data

US 2012/0014013 A1 Jan. 19, 2012

(51) Int. Cl.
G11B 20/18 (2006.01)

(52) U.S. Cl.
USPC ................................. 360/54; 360/31; 360/53

(58) Field of Classification Search
None
See application file for complete search history.

(56) References Cited

U.S. PATENT DOCUMENTS

| 5,600,500 | A | 2/1997 | Madsen et al. | |
|---|---|---|---|---|
| 6,442,705 | B1 | 8/2002 | Lamberts et al. | |
| 6,947,234 | B2 | 9/2005 | Lamberts et al. | |
| 7,177,979 | B2 * | 2/2007 | Kuwamura | 360/60 |
| 7,227,708 | B2 | 6/2007 | Feng | |
| 7,245,447 | B2 * | 7/2007 | Zaitsu | 360/60 |
| 7,345,837 | B1 * | 3/2008 | Schreck et al. | 360/31 |
| 7,463,441 | B2 * | 12/2008 | Cho et al. | 360/60 |
| 7,525,748 | B2 * | 4/2009 | Yamagishi | 360/31 |
| 7,567,400 | B2 | 7/2009 | Cheng | |
| 7,920,352 | B2 * | 4/2011 | Inoue et al. | 360/31 |
| 7,945,727 | B2 * | 5/2011 | Rothberg et al. | 711/112 |
| 7,974,029 | B2 * | 7/2011 | Tsai et al. | 360/31 |
| 8,014,097 | B1 * | 9/2011 | Sanvido | 360/60 |
| 8,068,299 | B2 * | 11/2011 | Tsunokawa et al. | 360/31 |
| 8,331,053 | B2 * | 12/2012 | Hobbet | 360/31 |
| 2006/0066971 | A1 | 3/2006 | Alex et al. | |
| 2009/0091861 | A1 | 4/2009 | Takano et al. | |
| 2009/0244775 | A1 | 10/2009 | Ehrlich | |

OTHER PUBLICATIONS

D. Guarisco et al., "A Fast and Accurate Method for Measuring Adjacent-Track Erasure", IEEE Transactions on Magnetics, vol. 42, No. 12, Dec. 2006, pp. 3868-3873.
Li et al., "Adjacent Track Erasure Analysis and Modeling at High Track Density", IEEE Transactions on Magnetics, vol. 39, No. 5, Sep. 2003, pp. 2627-2629.
Y. Liu et al., "Characterization of Skip or Far Track Erasure in a Side Shield Design", IEEE Transactions on Magnetics, vol. 45, No. 10, Oct. 2009, pp. 3660-3663.

* cited by examiner

*Primary Examiner* — Wayne Young
*Assistant Examiner* — James L Habermehl
(74) *Attorney, Agent, or Firm* — Thomas R. Berthold

(57) ABSTRACT

A hard disk drive (HDD) minimizes the effects of far track erasure (FTE) by counting the number of writes to the data tracks and incrementing counters based on the known effect of FTE on each track. The extent of the FTE effect is determined for each track within a range of tracks of the track being written, and based on the relative FTE effect for all the tracks in the range a count increment (CI) is determined for each track within the range. A counter is maintained for each track. For every writing to a track, a count for each track within a range of the track being written is increased by the CI value associated with the track number within the range. When the count value for a track reaches a predetermined threshold the data is read from that track and rewritten, preferably to the same track.

14 Claims, 5 Drawing Sheets

| TR # | Δlog (BER) | Count Increment (CI) |
|---|---|---|
| -16 | 0 | 0 |
| -15 | 0.5 | 0 |
| -14 | 0.75 | 1 |
| -13 | 1 | 2 |
| -12 | 2.5 | 56 |
| -11 | 2.3 | 35 |
| -10 | 2 | 18 |
| -9 | 1.75 | 10 |
| -8 | 0 | 0 |
| -7 | 0 | 0 |
| -6 | 0.25 | 0 |
| -5 | 0.28 | 0 |
| -4 | 0.28 | 0 |
| -3 | 0.25 | 0 |
| -2 | 0.2 | 0 |
| -1 | 0.75 | 1 |

| TR # | Δlog (BER) | Count Increment (CI) |
|---|---|---|
| +16 | 0 | 0 |
| +15 | 0 | 0 |
| +14 | 0 | 0 |
| +13 | 0 | 0 |
| +12 | 0 | 0 |
| +11 | 0 | 0 |
| +10 | 0 | 0 |
| +9 | 0 | 0 |
| +8 | 0 | 0 |
| +7 | 0 | 0 |
| +6 | 0 | 0 |
| +5 | 0 | 0 |
| +4 | 0 | 0 |
| +3 | 0 | 0 |
| +2 | 0.25 | 0 |
| +1 | 1.3 | 4 |

*FIG. 4*

DISK DRIVE WITH VARIABLE INCREMENTED COUNTING OF WRITES TO THE DATA TRACKS FOR MINIMIZING THE EFFECT OF FAR TRACK ERASURE

BACKGROUND OF THE INVENTION

1. Field of the Invention

This invention relates generally to magnetic recording hard disk drives (HDDs), and more particularly to a HDD that counts the number of writes to the data tracks to minimize the effect of far track erasure (FTE) during writing.

2. Description of the Related Art

HDDs with high data density are required to have high data track density, which means that the concentric data tracks are packed closer together. High track density increases the problem of adjacent track encroachment, also called adjacent track erasure (ATE). The write field from the write head is generally wider than a data track so when the write head is writing to a track, the outer portions of the write field (called the fringe field) overlap onto tracks adjacent to the track being written. This overlap is the ATE that will result in added noise and degradation of the data on the adjacent tracks. ATE occurs when old data stored in tracks adjacent to the track being written become degraded after many writings to the data track. ATE generally translates into an increase in bit error rate (BER), resulting in degradation of the performance and reliability of the HDD.

One approach for addressing the ATE problem is to count the number of writes to each track. When a track has been written a predetermined number of times, that track and one or more adjacent tracks on both sides of it are read and then rewritten. The effects of ATE cannot build up because significant repetitive writing of a single track is avoided. This approach is described in U.S. Pat. No. 7,567,400 B2, which is assigned to the same assignee as this application.

However, it has been discovered that data degradation due to fringe fields is not limited to adjacent tracks, but can extend over a range of tracks relatively far from the track being written. This effect is sometimes called wide-area track erasure (WATER) or far track encroachment or erasure (FTE). FTE is particularly noticeable with perpendicular write heads that have side shields. FTE may not affect tracks symmetrically on both sides of the track being written. Tracks on one side may encounter more pronounced FTE effects due to the write head shield design or due to read-write head skew. FTE is described by Liu et al., "Characterization of Skip or Far Track Erasure in a Side Shield Design", *IEEE TRANSACTIONS ON MAGNETICS*, VOL. 45, NO. 10, OCTOBER 2009, pp. 3660-3663.

Thus what is needed is a HDD that counts the writes to the data tracks in a manner that effectively addresses the problem of FTE.

SUMMARY OF THE INVENTION

The invention relates to a HDD that minimizes or essentially eliminates the effects of FTE by counting the number of writes to the data tracks and incrementing counters based on the known effect of FTE on each track. The extent of the FTE effect is determined for each track within a range of tracks of the track being written, and based on the relative FTE effect for all the tracks in the range a count increment (CI) is determined for each track. The CI values and their associated track numbers within the range may be stored as a table in memory. A counter is maintained for each track. For every writing to a track, a count for each track within a range of the track being written is increased by the CI value associated with the track number within the range. When the count value for a track reaches a predetermined threshold the data is read from that track and rewritten, preferably to the same track. Because a HDD typically includes multiple disk surfaces, each with an associated read/write head, and because not all heads will have the same exact write profiles, a table can be developed for each head and its associated disk surface. Also, for a zone-bit-recording (ZBR) HDD that has multiple annular data zones on each disk surface, a table may be maintained for each data zone.

For a fuller understanding of the nature and advantages of the present invention, reference should be made to the following detailed description taken together with the accompanying figures.

BRIEF DESCRIPTION OF THE DRAWING

FIG. 4 is a table of track number, BER value, and calculated count increment for tracks within a range of tracks for the perpendicular write head that produced the BER data of FIG. 3.

DETAILED DESCRIPTION OF THE INVENTION

Figure 1:
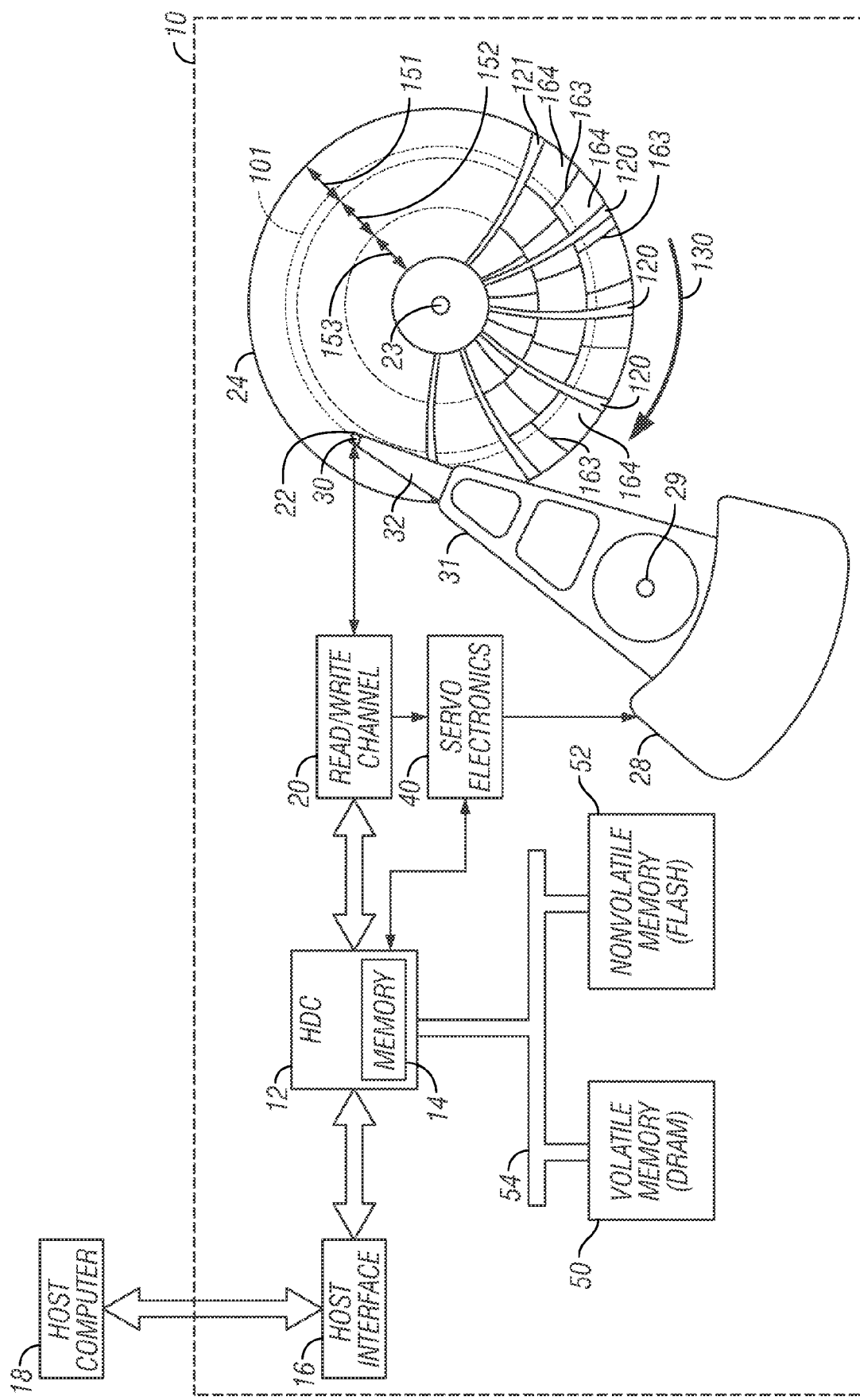
FIG. 1 is a block diagram of a magnetic recording hard disk drive (HDD) according to this invention.

FIG. 1 is a block diagram of a magnetic recording disk drive (HDD) 10 according to this invention. The HDD 10 includes a hard disk controller (HDC) 12 that can include and/or be implemented by a microcontroller or microprocessor. The controller 12 runs a computer program that is stored in memory 14 and that embodies the logic and algorithms described further below. The memory 14 may be separate from controller 12 or as embedded memory on the controller chip. The computer program may also be implemented in microcode or other type of memory accessible to the controller 12.

The controller 12 is connected to a host interface 16 that communicates with the host computer 18. The host computer 18 may be a portable computer that can operate from battery power. The host interface 16 may be any conventional computer-HDD interface, such as Serial ATA (Advanced Technology Attachment) or SCSI (Small Computer System Interface).

While the top view of FIG. 1 shows only a single disk 24 and associated read/write head 22, the HDD 10 typically includes a stack of disks 24 that are mounted on a spindle 23 and rotated by a spindle motor (not shown), with each disk surface being associated with one of the heads 22. The read/write head 22 is typically a combination of an inductive write head with a magnetoresistive read head and is located on the trailing end or end face of a head carrier or slider 30. Slider 30 is supported on the actuator arm 31 by a suspension 32 that enables the slider to "pitch" and "roll" on an air-bearing generated by the disk 24 as it rotates in the direction of arrow 130. The actuator arm 31 is attached to a rotary actuator 28 that rotates about pivot 29. Thus as the actuator 28 pivots, the path of slider 30 with attached read/write head 22 is not aligned with a disk radius, but is an arcuate path (like that shown by servo sectors 120 described below). Thus the end face of slider 30, which supports the read/write head 22, makes an angle (called the skew angle) with the disk radius, with the skew angle being a known function of disk radius and thus track number.

The disk 24 has radially-spaced concentric data tracks, one of which is shown as track 101. Each data track has a reference index 121 indicating the start-of-track. The HDD 10 is illustrated as a zone-bit-recording (ZBR) HDD because the data tracks are grouped radially into a number of annular data bands or zones, three of which are shown as zones 151, 152 and 153, but the invention is fully applicable to a HDD that does not use ZBR, in which case the HDD would have only a single data zone. Within each zone, the tracks are also circumferentially divided into a number of contiguous physical data sectors, such as typical data sectors 164 in the radially outer data zone. Each data sector 164 is preceded by a synchronization (sync) field, such as typical sync fields 163. The sync fields 163 are detectable by the read head for enabling synchronization of reading and writing the data bits in the data sectors 164. A sync field 163 is a nondata region on the disk that is magnetized each time data is written in its associated data sector 164.

Each data track also includes a plurality of circumferentially or angularly-spaced servo sectors 120 that contain positioning information detectable by the read head for moving the head 22 to desired data tracks and maintaining the head 22 on the data tracks. The servo sectors in each track are aligned circumferentially with the servo sectors in the other tracks so that they extend across the tracks in a generally radial direction, as represented by radially-directed servo sectors 120. The servo sectors 120 are nondata regions on the disk that are magnetized once, typically during manufacturing or formatting of the disk, and are not intended to be erased during normal operation of the HDD. In each track, each servo sector 120 has a servo identification (SID) mark, also called a servo timing mark (STM), that indicates the beginning of the servo sector. Typically there are multiple data sectors 164 located between the servo sectors.

The electronics associated with HDD 10 also include servo electronics 40. In the operation of HDD 10, the read/write channel 20 receives signals from head 22 and passes servo information from the servo sectors 120 to servo electronics 40 and data signals from the data sectors 164 to controller 12. Servo electronics 40 typically includes a servo control processor that uses the servo information from the servo sectors 120 to run a control algorithm that produces a control signal. The control signal is converted to a current that drives actuator 28 to position the head 22. In the operation of HDD 10, interface 16 receives a request from the host computer 18 for reading from or writing to the data sectors 164. Controller 12 receives a list of requested data sectors from interface 16 and converts them into a set of numbers that uniquely identify the disk surface, track and data sector. The numbers are passed to servo electronics 40 to enable positioning head 22 to the appropriate data sector 164.

The controller 12 acts as a data controller to transfer blocks of write data from the host computer 18 through the read/write channel 20 for writing to the disks 24 by the heads 22, and to transfer blocks of read data from the disks 24 back to the host computer 18. HDDs typically include, in addition to the rotating disk storage, solid state memory (referred to as "cache") that temporarily holds data before it is transferred between the host computer and the disk storage. The conventional cache is dynamic random access memory (DRAM), a volatile form of memory that can undergo a significant number of write/erase cycles and that has a high data transfer rate. HDDs may also include nonvolatile memory. One type of nonvolatile memory is "flash" memory, which stores information in an array of floating gate transistors, called "cells" which can be electrically erased and reprogrammed in blocks. Thus in HDD 10, the controller 12 also communicates with volatile memory 50 (shown as DRAM) and optional nonvolatile memory 52 (shown as FLASH) via data bus 54.

To meet the demand for HDDs with high data density, the data track spacing or "pitch" has decreased, which means that the concentric tracks are packed closer together. This not only increases the error rate of the written track, but also increases the problem of adjacent track encroachment, also called adjacent track erasure (ATE). In general, ATE occurs when old data stored in tracks adjacent to the track being written become degraded after many writings to the data track. ATE generally translates into an increase in bit error rate (BER), resulting in degradation of the performance of the disk drive. In some severe cases, poor BER will lead to a significant increase of unrecoverable data errors. ATE has been described by Zhihao Li et al., "Adjacent Track Erasure Analysis and Modeling at High Track Density", *IEEE TRANSACTIONS ON MAGNETICS*, VOL. 39, NO. 5, SEPTEMBER 2003, pp. 2627-2629.

Figure 2:
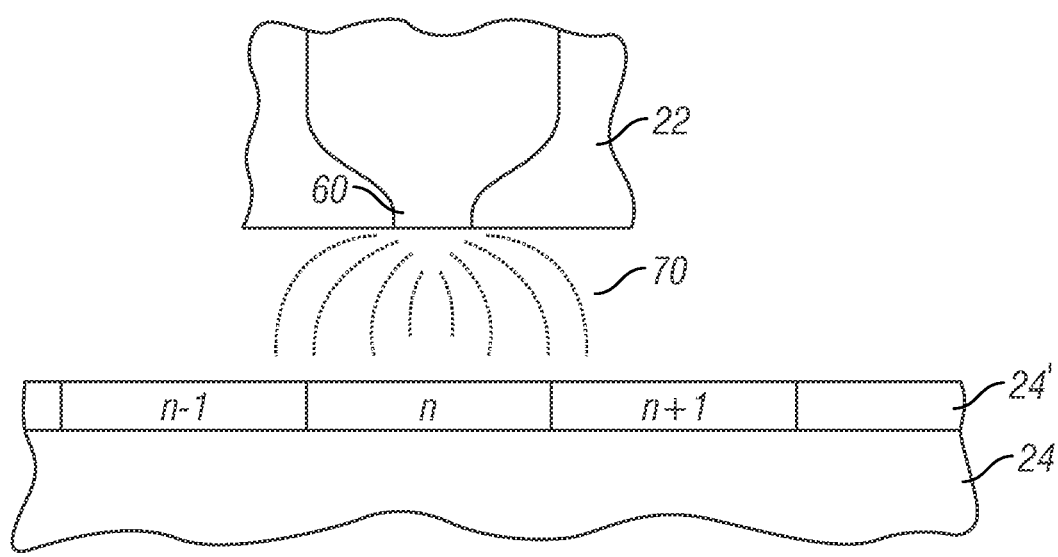
FIG. 2 is a sectional view of a disk and associated read/write head illustrating the problem of adjacent track encroachment (ATE) during writing.

The problem of ATE is shown schematically in FIG. 2, which is a sectional view of a disk 24 and associated read/write head 22. The disk 24 is shown with recording layer 24' having written data tracks n−1 to n+1. The write pole 60 of read/write head 22 generates a magnetic write field 70 directed to track n aligned with pole 60. The write pole 60 may be the write pole of a perpendicular write head, meaning that the write field 70 magnetizes regions of the recording layer 24' in the direction perpendicular to the recording layer 24'. However, the write field 70 is generally wider than a data track so when the write pole 60 is writing to track n, the outer portions (called the fringe field) of the write field 70 overlap onto at least tracks n+1 and n−1, the single tracks on either side of the track being written. This overlap is the ATE that will result in added noise and degradation of the data on the tracks n+1 and n−1. ATE may also occur in tracks more than one track, for example two tracks, away from the track being written.

However, it has been discovered that data degradation due to fringe fields is not limited to adjacent tracks, but can extend over a range of tracks relatively far from the track being written. This effect is sometimes called wide-area track erasure (WATER) or far track encroachment or erasure (FTE). FTE is particularly noticeable with perpendicular write heads that have side shields. FTE may not affect tracks symmetrically on both sides of the track being written. Tracks on one side may encounter more pronounced FTE effects due to the write head shield design or due to read/write head skew. FTE is described by Liu et al., "Characterization of Skip or Far Track Erasure in a Side Shield Design", *IEEE TRANSACTIONS ON MAGNETICS*, VOL. 45, NO. 10, OCTOBER 2009, pp. 3660-3663.

In this invention variable incremented counting is performed for the tracks subjected to the FTE effects. The magnitude or extent of the FTE effect is determined for each track within a range of tracks of the track being written, and based on the relative FTE effect for all the tracks in the range a count increment (CI) is determined for each track. A counter is maintained for each track, and when data is written to a track the counters are increased by the predetermined increments based on the number of tracks from the track being written. When the count for a track reaches a predetermined threshold, that track is read and then rewritten. The data is rewritten before the FTE effects can build up, so the reliability of the data is improved. The tracks can be grouped into segments, for example 4 tracks per segment, and all the tracks in a segment read and rewritten when a count threshold for a segment is reached. This will reduce the amount of memory required to store the counts for each track.

Figure 3:
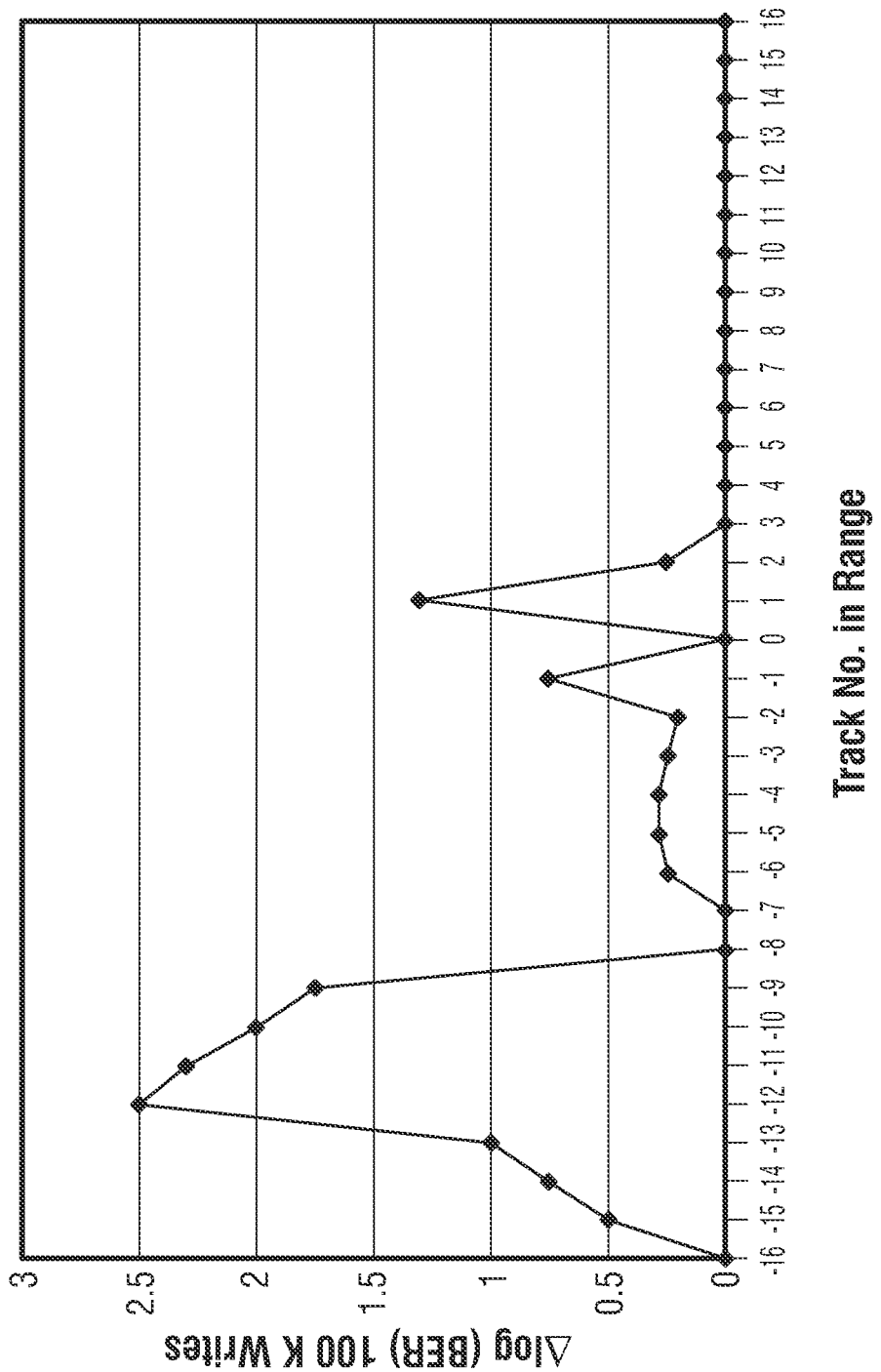
FIG. 3 is a graph of measured bit error rate (BER) degradation values for a range of tracks written by a perpendicular recording head.

In one approach for determining the relative FTE effects on the tracks within a range of tracks of the track being written, the error rate is used to determine the count increments. A predetermined data pattern is written to all the tracks within a range of −N to +N tracks from a track (designated track 0). An initial "bit" error rate (BER) is then measured for each track in the range of 2N tracks. In one well-known approach for measuring BER, the HDD's error correction circuitry is deactivated, for example by setting to zero the value in the error correction register for the maximum number of errors to correct, and then the data pattern is read back and the number of bytes in error is counted. Since there must be at least one bit in error for each byte in error, this is the initial BER for each track in the range. Then track 0 is written a very large number of times (for example 100,000 writes). The BER is then again measured for all 2N tracks in the range. The degradation in BER is the difference between the measured BER after the writes to track 0 and the initial BER. FIG. 3 is a graph of measured BER degradation values for a range of 32 tracks written by a perpendicular write head. The y-axis of FIG. 3 is the difference in the logarithm of the measured BER after writes and the logarithm of the initial BER (Δ log (BER)). This graph shows the expected ATE effect at tracks −1 and +1. The FTE effect is clearly shown by the high BER values for tracks −9 to −15, which are significantly higher than the BER values for tracks closer to track 0 (tracks −2 to −8). FIG. 3 also shows the unsymmetrical characteristic of FTE, with very low BER values for tracks between +2 and +16. From the measured BER degradation values, which represent the relative weightings of FTE for all the tracks within the range, a set of count increments can be calculated for all the tracks within the range. FIG. 4 is a table of track number (TR#), BER degradation value (logarithmic), and calculated count increment (CI) for 32 tracks within a range of −16 to +16 tracks for the perpendicular write head that produced the BER data of FIG. 3. In this example a Δ log (BER) of 0.75 is an arbitrary reference value (REF) and assigned a count increment of 1 (as shown by track −1). The count increments are then calculated for each track based on the BER degradation for that track. Because the BER values are logarithmic, a count increment (CI) is calculated for each track number (TR#) according to the following:

$$CI_{TR\#}=10^{[\Delta\ log(BER_{TR\#})-REF]}$$

In this invention, for every writing to a data track, a count for each track within a range of the track being written is increased by its value of CI according to a table of CI values (for example, −16 tracks to +16 tracks in the table of FIG. 4). During operation of the HDD, the controller (HDC 12 in FIG. 1), or another controller or microprocessor in the HDD, identifies the track number where data is being written, recalls from the table the CI values for each track within the range and increases the counters for each track within the range by the recalled CI values. The table and the counters are stored in memory associated with controller 12, for example memory 14, which may be embedded in controller 12, volatile memory 50 or nonvolatile memory 52. When the count value for a track reaches a predetermined threshold (T) the data is read from that track and rewritten, preferably to the same track. The value for T can be chosen based on several factors, including the known track density of the HDD, the intended purpose of the HDD, the desired reliability, and the BER of the HDD measured during manufacturing. Thus, depending on these factors, T may be chosen to be a relatively high value, for example higher than 10,000, or a relatively low value, for example less than several hundred.

Because a HDD typically includes multiple disk surfaces, each with an associated read/write head, and because not all heads will have the same exact write profiles, a table like that in FIG. 4 can be developed for each head and its associated disk surface. Also, because of head skew, the write profile and thus the FTE effects for a particular head may vary depending on the radial position of the head. Thus multiple tables like the table in FIG. 4 may be maintained for each head, depending on the radial position of the head. For example, in a ZBR HDD like that shown in FIG. 1, a table may be maintained for each data zone.

The invention has been described above for an implementation where there is a counter for each data track. Because HDDs may have a large number of tracks, e.g., several hundred thousand, a significant amount of memory may be required to store the counts for each track. Thus in a modification of the invention the tracks can be grouped into multiple-track data segments, where each segment is within a range of the segment containing the track being written, and each segment has an associated predetermined count increment. When the count for a segment reaches a predetermined threshold, all the tracks in that segment are read and then rewritten.

Figure 5:
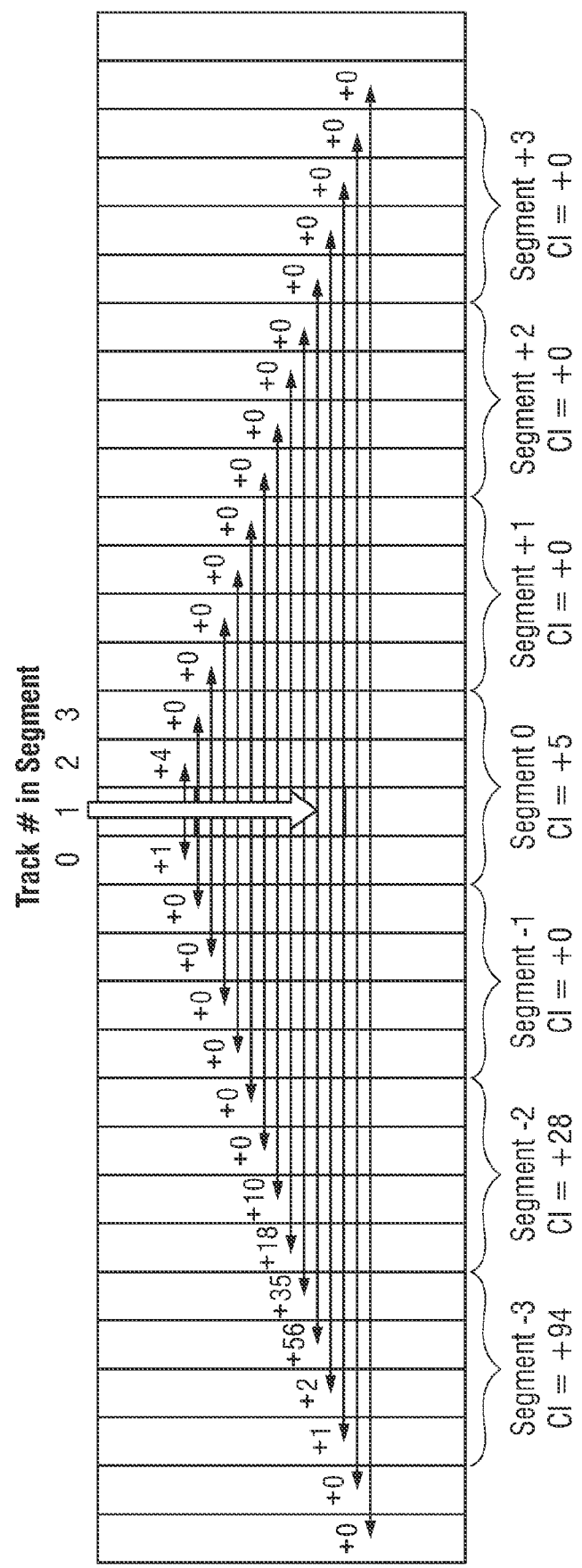
FIG. 5 is a graphical representation of the example of FIGS. 3-4 wherein the data tracks are grouped into data segments, each segment having 4 tracks.

FIG. 5 is a graphical representation of the example of FIGS. 3-4 wherein the data tracks are grouped into data segments, each segment having M tracks (M=4 in the example of FIG. 5). Segment 0 corresponds to tracks −1 to +3 in the table of FIG. 4 and thus segment 0 has a CI of 5 (the sum of the CI values for tracks −1 to +3 in the table of FIG. 4). The CI for each segment is thus related to the sum of the BER degradation values for all the tracks in the segment. In the example of FIG. 5, the downward arrow represents the track being written, which is track 1 of segment 0, where the tracks in each segment are numbered from 0 to M−1. Thus, for example, segment −2 includes tracks −7 to −10 in the table of FIG. 4 and the count increment (CI) for segment −2 is 28, which is the sum of the CI values for tracks −7 to −10. So the writing of track 1 in segment 0 would result in the count for segment −2 being increased by a CI of 28. In this modification of the invention, there is a separate table depending on which track in the segment is being written. For an implementation with M tracks in a segment, there would be M tables. For example, if the track being written is track 3 rather than track 1 in segment 0, there would be a 2-track shift in the FTE effect on the segments in the range. Segment −2 is now tracks −9 to −12, rather that tracks −7 to −10, from the track being written. Thus a different table would be addressed and this table would have a CI of 109, the sum of the CI values of tracks −9 to −12. So the writing of track 3 in segment 0 would result in the count for segment −2 being increased by a CI of 109.

In the implementation with the use of multiple-track segments, the controller (HDC 12 in FIG. 1), identifies the track number where data is being written and thus the segment number and the track number within that segment, determines which table to select for access, recalls from the selected table the CI values for each segment within the range of the segment containing the track where data is to be written, and increases the counters for each segment within the range by the recalled CI values. The controller also increases the counter for the segment containing the track being written by the CI for that segment (CI=5 for segment 0 in the example of FIG. 5). The table and the counters are stored in memory associated with controller 12, for example memory 14, which may be embedded in controller 12, volatile memory 50 or nonvolatile memory 52. When the count value for a segment reaches a predetermined threshold (T) the data is read from all the tracks in that segment and rewritten, preferably to the same tracks.

The operation of the HDD as described above may be implemented as a set of computer program instructions stored in memory and executable by a processor, such as the HDC, or a separate controller or microprocessor in the HDD. The controller performs logical and arithmetic operations based on the program instructions stored in memory, and is thus capable of performing the functions described above and represented in the figures.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk drive comprising:
    a magnetic recording disk having a plurality of concentric data tracks on a surface of the disk for the storage of data;
    a write head associated with said disk surface for generating a magnetic write field to write data to the data tracks;
    a read head for reading data written in the data tracks;
    a controller for controlling the writing of data by the write head to the data tracks; and
    memory coupled to the controller and containing a program of instructions readable by the controller for minimizing the effect of encroachment of the write field on data tracks within a range between −N tracks and +N tracks of the data track being written, the program of instructions undertaking the method acts comprising:
        (a) maintaining in memory a count for each track, the memory including a table of 2N tracks having range numbers between −N and +N and corresponding 2N increment values;
        (b) for each writing of data to a track, determining the range number for each track within said range, recalling from the table in memory the corresponding increment value and increasing said count by said recalled increment value for each track within said range; and
        (c) when a count for a track reaches a predetermined threshold, reading the data from said threshold-count track and rewriting the data read from said threshold-count track.

2. The disk drive of claim 1 wherein each of the 2N increment values is related to a measured error rate for the corresponding track.

3. The disk drive of claim 1 wherein the disk surface has a plurality of annular zones, each having a plurality of concentric data tracks, and wherein the program of instructions comprise undertaking method acts (a) through (c) for each zone.

4. The disk drive of claim 1 wherein the disk drive has a plurality of disk surfaces, each having a plurality of concentric data tracks, and associated write heads, and wherein the program of instructions comprise undertaking method acts (a) through (c) for each disk surface.

5. The disk drive of claim 1 wherein the write head is a perpendicular write head.

6. The disk drive of claim 1 wherein the memory is nonvolatile memory.

7. A magnetic recording disk drive comprising:
    a magnetic recording disk having a plurality of concentric data tracks on a surface of the disk for the storage of data;
    a write head associated with said disk surface for generating a magnetic write field to write data to the data tracks;
    a read head for reading data written in the data tracks;
    a controller for controlling the writing of data by the write head to the data tracks; and
    memory coupled to the controller, the memory containing a table of multiple-track data segments and corresponding count increment values and a program of instructions readable by the controller for minimizing the effect of encroachment of the write field on segments within a predetermined range of the segment in which a data track is being written, the program of instructions undertaking the method acts comprising:
        (a) maintaining in memory a count for each segment;
        (b) for each writing of data to a track, recalling from the table in memory the corresponding count increment value for each segment within the range and increasing said count for each segment within the range by said recalled count increment value; and
        (c) when a count for a segment reaches a predetermined threshold, reading the data from all of the tracks in said threshold-count segment and rewriting the data read from said threshold-count segment.

8. The disk drive of claim 7 wherein there are M data tracks in each segment and further comprising M tables of multiple-track data segments and corresponding count increment values in memory, and wherein recalling from the table in memory comprises first selecting one of the M tables in response to which of the 0 to M−1 tracks is being written in the segment being written.

9. The disk drive of claim 7 wherein M equals 4.

10. The disk drive of claim 7 wherein each of the count increment values is related to the sum of the measured error rates for all the tracks in the corresponding segment.

11. The disk drive of claim 7 wherein the disk surface has a plurality of annular zones, each having a plurality of concentric data tracks, and wherein the program of instructions comprise undertaking method acts (a) through (c) for each zone.

12. The disk drive of claim 7 wherein the disk drive has a plurality of disk surfaces, each having a plurality of concentric data tracks, and associated write heads, and wherein the program of instructions comprise undertaking method acts (a) through (c) for each disk surface.

13. The disk drive of claim 7 wherein the write head is a perpendicular write head.

14. The disk drive of claim 7 wherein the memory is nonvolatile memory.

* * * * *